US006042676A

United States Patent [19]

Stein

[11] Patent Number: 6,042,676

[45] **Date of Patent: *Mar. 28, 2000**

[54] HEAT-TRANSFER LABEL INCLUDING A POLYESTER INK LAYER

[75] Inventor: Samuel H. Stein, Westborough, Mass.

[73] Assignee: Avery Denmson Corporation, Pasadena, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/673,098

[22] Filed: Jul. 1, 1996

[51] Int. Cl.[7] ................................ B65C 3/08; B65C 3/26; B32B 7/06

[52] U.S. Cl. .......................... 156/239; 156/240; 156/289; 156/DIG. 9; 156/DIG. 18; 156/DIG. 21; 428/202; 428/348; 428/349; 428/352; 428/354; 428/914

[58] Field of Search .................................... 156/239, 240, 156/289, DIG. 9, DIG. 11, DIG. 18, DIG. 21; 428/200, 201, 202, 203, 205, 346, 347, 348, 349, 352, 355 R, 914, 354

[56] References Cited

U.S. PATENT DOCUMENTS

| | | | |
|---|---|---|---|
| 2,920,009 | 1/1960 | Humphner | 156/240 |
| 3,907,974 | 9/1975 | Smith . | |
| 3,922,435 | 11/1975 | Asnes . | |
| 4,321,185 | 3/1982 | Benitez . | |
| 4,426,422 | 1/1984 | Daniels . | |
| 4,536,434 | 8/1985 | Magnotta | 428/348 X |
| 4,548,857 | 10/1985 | Galante . | |
| 4,555,436 | 11/1985 | Geurtsen et al. | 428/348 X |
| 4,927,709 | 5/1990 | Parker et al. . | |
| 4,935,300 | 6/1990 | Parker et al. . | |
| 4,971,644 | 11/1990 | Mahn, Sr. et al. | 156/253 |
| 5,411,698 | 5/1995 | Mero et al. . | |
| 5,766,731 | 6/1998 | Stein et al. | 156/240 X |
| 5,800,656 | 9/1998 | Geurtsen et al. | 156/239 |
| 5,824,176 | 10/1998 | Stein et al. | 156/239 |
| 5,908,694 | 6/1999 | Makar et al. . | |
| 5,932,319 | 8/1999 | Makar et al. . | |
| 5,972,481 | 10/1999 | Stein et al. . | |

OTHER PUBLICATIONS

Technical literature, Benzoflex® S–404 glyceryl tribenzoate, Velsicol Chemical Corporation, Chicago, IL, publicly available before the filing of the present application.

Technical literature, ViTEL® 2300 and 2700 polyester resins, Shell Chemical Company, Akron, OH, publicly available before the filing of the present application.

*Primary Examiner*—Curtis Mayes
*Attorney, Agent, or Firm*—Kriegsman & Kriegsman

[57] ABSTRACT

A heat-transfer label suitable for use on silane-treated glass containers, refundable polyethylene terephthalate containers, and the like. According to one embodiment, the label includes a sheet of paper overcoated with a release layer of polyethylene. A skim coat of wax is overcoated onto the polyethylene-coated paper. A protective lacquer layer comprising a polyester, polyester/vinyl or polyester/vinyl with wax lacquer is printed onto the skim coat. An ink design layer comprising one or more polyester inks is printed onto the protective lacquer layer. An adhesive layer comprising a polyester, polyester/vinyl or polyester/vinyl with wax adhesive is printed onto the ink design layer.

13 Claims, 1 Drawing Sheet

HEAT-TRANSFER LABEL INCLUDING A POLYESTER INK LAYER

BACKGROUND OF THE INVENTION

The present invention relates generally to heat-transfer labels and more particularly to a novel heat-transfer label including a polyester ink layer.

Heat-transfer labels are commonly used in the decorating and/or labelling of commercial articles, such as, and without limitation to, containers for beverages (including alcoholic beverages such as beer), essential oils, detergents, adverse chemicals, as well as health and beauty aids. As can readily be appreciated, heat-transfer labels are desirably resistant to abrasion and chemical effects in order to avoid a loss of label information and desirably possess good adhesion to the articles to which they are affixed.

One well-known type of heat-transfer label is described in U.S. Pat. No. 3,616,015, inventor Kingston, which issued October, 1971, and which is incorporated herein by reference. In the aforementioned patent, there is disclosed a heat-transfer label comprising a paper sheet or web, a wax release layer affixed to the paper sheet, and an ink design layer printed on the wax release layer. In the heat-transfer labelling process, the label-carrying web is subjected to heat, and the label is pressed onto an article with the ink design layer making direct contact with the article. As the paper sheet is subjected to heat, the wax layer begins to melt so that the paper sheet can be released from the wax layer. After transfer of the design to the article, the paper sheet is immediately removed, leaving the design firmly affixed to the article and the wax layer exposed to the environment. The wax layer is thus intended to serve two purposes: (1) to provide release of the ink design from the web upon application of heat to the web and (2) to form a protective layer over the transferred ink design. After transfer of the label to the article, the transferred wax release layer is typically subjected to a post-flaming technique which enhances the optical clarity of the wax protective layer over the ink design and which enhances the protective properties of the transferred wax release.

In some heat-transfer labels, an adhesive layer is deposited over the ink design to facilitate adhesion of the label onto a receiving article. An example of such a heat-transfer label is disclosed in U.S. Pat. No. 4,548,857, inventor Galante, which issued Oct. 22, 1985, and which is incorporated herein by reference. Additionally, in some heat-transfer labels, a protective lacquer layer is interposed between the wax release layer and the ink layer. An example of such a label is disclosed in U.S. Pat. No. 4,426,422, inventor Daniels, which issued Jan. 17, 1984, and which is incorporated herein by reference.

One problem that has been noted with heat-transfer labels of the type described above containing a wax release layer is that, quite often, a degree of hazing or a "halo" is noticeable over the transferred label when the transfer is made onto clear materials. This "halo" effect, which persists despite post-flaming, is a result of the nature of the wax coating around the outer borders of the transferred ink design layer. Hazing due to the wax release layer may also appear in "open-copy" areas of the label, i.e., areas of the label where no ink is present between the adhesive and protective lacquer layers, and also represents a problem.

Accordingly, to overcome the aforementioned "halo" effect, considerable effort has been expended in replacing or obviating the need for a wax release layer. One such wax-less, heat-transfer label is disclosed in U.S. Pat. No. 3,922,435, inventor Asnes, which issued Nov. 25, 1975. In the aforementioned patent, the layer of wax is replaced with a layer of a non-wax resin. This non-wax resinous layer is referred to in the patent as a dry release since it does not transfer to the article along with the ink design layer. In a preferred embodiment of the patent, the non-wax resinous layer comprises a thermoset polymeric resin, such as cross-linked resins selected from the group consisting of acrylic resins, polyamide resins, polyester resins, vinyl resins and epoxy resins.

Another example of a wax-less, heat-transfer label is disclosed in U.S. Pat. No. 4,935,300, inventors Parker et al., which issued Jun. 19, 1990, and which is incorporated herein by reference. In the aforementioned patent, the label, which is said to be particularly well-suited for use on high density polyethylene, polypropylene, polystyrene, polyvinylchloride and polyethylene terephthalate surfaces or containers, comprises a paper carrier web which is overcoated with a layer of polyethylene. A protective lacquer layer comprising a polyester resin and a relatively small amount of a non-drying oil is printed onto the polyethylene layer. An ink design layer comprising a resinous binder base selected from the group consisting of polyvinylchloride, acrylics, polyamides and nitrocellulose is then printed onto the protective lacquer layer. A heat-activatable adhesive layer comprising a thermoplastic polyamide adhesive is then printed onto the ink design layer.

Although the above-described wax-less, heat-transfer label eliminates the waxrelated "halo" effect discussed previously, said label does not quite possess the same release characteristics of heat-transfer labels containing a wax release layer. Accordingly, another type of heat-transfer label differs from the heat-transfer label disclosed in U.S. Pat. No. 4,935,300, only in that a very thin layer or "skim coat" of a waxlike material is interposed between the polyethylene release layer and the protective lacquer layer to improve the release of the protective lacquer from the polyethylene-coated carrier web. The thickness of the skim coat corresponds to approximately 0.1–0.4 lbs. of the wax-like material spread onto about 3000 square feet of the polyethylene release layer.

The aforementioned types of heat-transfer labels may be used to decorate a variety of surfaces and materials including, but not limited to, glass and polyethylene terephthalate (PET) containers. Glass containers are frequently, although not invariably, pre-treated (typically by the container manufacturer) with polyethylene, oleic acid, stearate or a similar material whose function is to enhance abrasion resistance and lubricity. Such containers, whether or not previously subjected to the foregoing type of pre-treatment (or whether or not such a pre-treatment is later removed from the container), are typically treated, prior to decoration, with a silane adhesion promoter of the type described in U.S. Pat. No. 3,907,974, inventor Smith, which issued Sep. 23, 1975 and which is incorporated herein by reference.

One type of polyethylene terephthalate container is referred to in the art as a refundable polyethylene terephthalate (RefPET) container. A RefPET container, which typically has a thickness greater than a non-refundable PET container, is intended for one or more re-uses after its initial use and is designed to withstand caustic washings between uses.

An example of a heat-transfer label which has been used by the assignee of the present application on refundable polyethylene terephthalate (RefPET) containers comprises a support portion in the form of polyethylene-coated paper and a transfer portion including a protective lacquer layer printed onto the polyethylene-coated paper and comprising a polyester/vinyl lacquer and a wax, a polyester/vinyl ink design layer printed on the protective lacquer, and a polyester adhesive printed on the polyester/vinyl ink design layer. A 4:1 mixture of ViTEL® 2300 polyester resin (Shell Chemical Company, Akron, Ohio): VAGH vinyl resin (Union Carbide Corporation, Hackensack, N.J.), with a suitable colorant, in 1:1 toluene:methyl ethyl ketone (MEK) is one example of a polyester/vinyl ink system used in the aforementioned label.

One type of ink design commonly employed in heat-transfer labels of the type described above is referred to in the art as "line copy," and another type of ink design commonly employed in such labels is referred to in the art as a "vignette." Line copy typically refers to an ink design generated by complete coverage of a desired label area with ink. A vignette typically refers to an ink design characterized by a gradual change in color from a first color to a second color and generated by the arrangement of a plurality of ink dots of varying size and color.

With respect to the aforementioned RefPET heat-transfer labels, the present inventor has observed that the ink vehicles (i.e., the inks without pigments) tend to be hazy, thereby indicating an incompatibility of the resins in the ink. In addition, at constant solids, the viscosity of the vehicles rapidly increase with decreasing amounts of the more volatile MEK. In actual printing, the more volatile solvent leaves first, and solids increase due to evaporation. All this leads to very rapid increases in viscosity. Moreover, the supplier of the polyester resin reports that a toluene/MEK solvent system of the type being used is not the best solvent system for this resin. The net effect of the problems described above is that yields in the manufacturing process have been less than optimal. Moreover, when the present inventor has tried to use the foregoing polyester/vinyl ink to print vignettes on the above-mentioned protective lacquer, printing quality has been rather poor and yields have been quite low.

Glass containers have also been labelled by the assignee of the present application using heat-transfer labels similar to those used in labelling RefPET containers, the heat-transfer labels for glass containers comprising polyethylene-coated paper, a wax-like skim coat overcoated on the polyethylene-coated paper, a protective lacquer printed onto the skim coat and comprising a polyester/vinyl lacquer, a polyester/vinyl ink design layer printed on the protective lacquer, and a polyester adhesive printed on the polyester/vinyl ink design layer.

SUMMARY OF THE INVENTION

It is an object of the present invention to provide a novel heat-transfer label.

It is another object of the present invention to provide a heat-transfer label as described above that overcomes at least some of the problems discussed above in connection with other heat-transfer labels.

The present invention is premised on the surprising discovery that, as compared to the printing quality obtained when printing a polyester/vinyl ink onto a polyester/vinyl or polyester/vinyl with wax protective lacquer layer, an unexpected improvement in printing quality of the ink design layer can be obtained by using the combination of a polyester ink and a protective lacquer layer comprising a polyester/vinyl lacquer or a polyester/vinyl with wax lacquer. Moreover, the improvement in printing quality is particularly acute when using two or more polyester inks to print a vignette design onto a protective lacquer layer comprising a polyester/vinyl with wax lacquer.

In furtherance of the above and other objects that are herein disclosed or are apparent from the present specification, there is provided a heat-transfer label which comprises (a) a support portion; and (b) a transfer portion over said support portion for transfer of the transfer portion from the support portion to an article upon application of heat to the support portion while the transfer portion is placed into contact with the article, said transfer portion comprising (i) a protective lacquer layer, the protective lacquer layer comprising a polyester/vinyl lacquer or a polyester/vinyl with wax lacquer; (ii) a polyester ink layer over said protective lacquer layer; and (iii) an adhesive layer over said ink layer.

The aforementioned heat-transfer label may be used on a variety of articles including, but not limited to, silane-treated glass containers (preferably of the type that are not subjected to pasteurization-type conditions), polyethylene terephthalate (PET) containers or the like. The adhesive layer of the above heat-transfer label may comprise a polyester adhesive, a polyester/vinyl adhesive or a polyester/vinyl with wax adhesive. The foregoing heat-transfer label may or may not additionally include a wax-like skim coat interposed between the protective lacquer layer and the polyethylene coated paper.

In addition to being directed to the above-described heat-transfer labels, the present invention is also directed to the transfer portion of the heat-transfer labels, as well as to methods of labelling articles, such as silane-treated glass containers, with the above-described heat-transfer labels.

For purposes of the present specification and claims, it is to be understood that certain terms used herein, such as "on" or "over," when used to denote the relative positions of two or more layers of a heat-transfer label, are primarily used to denote such relative positions in the context of how those layers are situated prior to transfer of the transfer portion of the label to an article since, after transfer, the arrangement of layers is inverted as those layers which were furthest removed from the associated support sheet are now closest to the labelled article. Also for purposes of the present specification and claims, the term "polyester ink" is to be contrasted with and defined to exclude any of the class of polyester/vinyl inks. Similarly, the terms "polyester lacquer" and "polyester adhesive" are to be contrasted with and defined to exclude any of the class of polyester/vinyl lacquers and polyester/vinyl adhesives, respectively.

Additional objects, as well as features, advantages and aspects of the present invention, will be set forth in part in the description which follows, and in part will be obvious from the description or may be learned by practice of the invention. In the description, reference is made to the accompanying FIGURE which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying FIGURE, which is hereby incorporated into and constitutes a part of this specification, illustrates a preferred embodiment of the invention and, together with the description, serves to explain the principles of the invention. In the FIGURE wherein like reference numerals represent like parts.

DETAILED DESCRIPTION OF PREFERRED EMBODIMENTS

Figure 1:
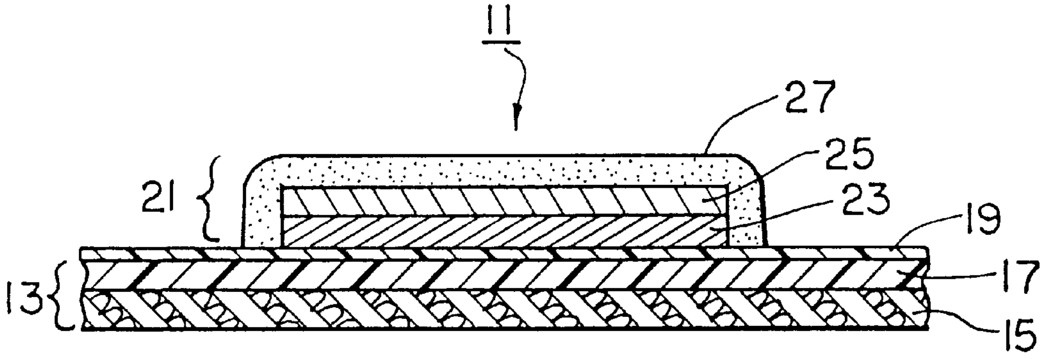
FIG. 1 is a schematic section view of a first embodiment of a heat-transfer label that is particularly well-suited for, but not limited to, use on silane-treated glass containers and PET containers, the heat-transfer label being constructed according to the teachings of the present invention.

Referring now to FIG. 1, there is shown a schematic section view of a first embodiment of a heat-transfer label that is particularly well-suited for, but not limited to, use on silane-treated glass containers and PET (particularly RefPET) containers, the heat-transfer label being constructed according to the teachings of the present invention and being represented generally by reference numeral 11. (It is to be understood that, for purposes of the present specification and claims, the expression "silane-treated glass containers" refers both to silane-treated glass containers that have been pre-treated with an abrasion-resistance material, such as polyethylene, oleic acid, stearate or the like, and to silane-treated glass containers that have not been so pre-treated.) Preferably, the containers labelled with label 11 are not subjected to pasteurization-type conditions.

Label 11 comprises a support portion 13. Support portion 13, in turn, comprises a carrier web 15 overcoated with a polyethylene layer 17. Carrier web 15 is typically made of paper or a similarly suitable substrate. Details of polyethylene layer 17 are disclosed in U.S. Pat. No. 4,935,300, discussed above, and in U.S. Pat. No. 4,927,709, inventors Parker et al., which issued on May 22, 1990, which is incorporated herein by reference.

Label 11 also comprises a skim coat 19 of the type described above, which is coated directly on top of the entirety of polyethylene layer 17. During label transfer, a small portion of skim coat 19 is transferred along with the transfer portion of label 11 onto the article being labelled, the amount of skim coat 19 transferred onto the article being labelled not being readily discernible.

Label 11 further comprises a transfer portion 21. Transfer portion 21, in turn, includes a protective lacquer layer 23 printed directly on top of a portion of skim coat 19, an ink design layer 25 printed onto a desired area of lacquer layer 23, and a heat-activatable adhesive layer 27 printed onto design layer 25.

Protective lacquer layer 23 comprises a polyester lacquer, a polyester/vinyl lacquer or a polyester/vinyl with wax lacquer. A polyester/vinyl with wax lacquer is preferred where design layer 25 includes a vignette. A polyester or polyester/vinyl lacquer is preferred where one wishes to maximize clarity in open-copy areas (areas of the label where no ink is present between layers 23 and 27), particularly where the labelled container is a glass container. To form lacquer layer 23, a lacquer composition comprising a one of the aforementioned lacquers and one or more suitable volatile organic solvents are deposited onto a desired area of skim coat 19, preferably by gravure printing or a similar technique. After deposition of the lacquer composition on the desired area of skim coat 19, the volatile organic solvent(s) evaporate(s), leaving only the non-volatile lacquer to make up lacquer layer 23. An example of a polyester/vinyl with wax protective lacquer composition comprises 15.40%, by weight, ViTEL® 2300 polyester resin; 5.03%, by weight, VAGH® vinyl resin; 6.5%, by weight, NEPTUNE® wax; 27.42%, by weight, toluene; 22.50%, by weight, methyl ethyl ketone; and 22.50%, by weight, ethyl acetate. An example of a polyester/vinyl protective lacquer composition comprises 16.00%, by weight, ViTEL® 2300 polyester resin; 8.00%, by weight, VAGH® vinyl resin; 54.70%, by weight, toluene; and 25.30%, by weight, methyl ethyl ketone.

Ink design layer 25 of transfer portion 21 comprises one or more polyester inks. Ink design layer 25 is formed in the conventional manner by depositing, by gravure printing or the like, an ink composition comprising a polyester resin, a suitable pigment or dye and one or more suitable volatile organic solvents onto one or more desired areas of lacquer layer 23. After application of the ink composition onto lacquer layer 23, the volatile solvent component(s) of the ink composition evaporate(s), leaving only the non-volatile ink components to form layer 25. An example of a suitable resin for use in forming a polyester ink is ViTEL® 2700 (Shell Chemical Company, Akron, Ohio)—a copolyester resin having a high tensile strength (7000 psi) and a low elongation (4% elongation). A ViTEL® 2700-based polyester ink composition may comprise 18%, by weight, ViTEL® 2700; 6%, by weight, pigment; 30.4%, by weight, n-propyl acetate; and 45.6%, by weight, toluene. As can readily be appreciated, ViTEL® 2700 is, by no means, the only polyester resin that may be used to formulate a polyester ink, and solvent systems, other than the one exemplified above, may be suitable for use with ViTEL® 2700, as well as with other polyester resins.

As noted above, the present inventor has observed that polyester inks print unexpectedly well on lacquer layers comprising polyester, polyester/vinyl and polyester/vinyl with wax lacquers and that vignettes printed with polyester inks on polyester/vinyl with wax lacquer layers are surprisingly superior in print quality to vignettes printed with polyester/vinyl inks on the same lacquer layers.

Preferably where the container being labelled is not subjected to pasteurization-type conditions, adhesive layer 27 of transfer portion 21 comprises a polyester, polyester/vinyl or polyester/vinyl with wax adhesive. Adhesive layer 27 is formed by depositing onto ink layer 25, by gravure printing or the like, an adhesive composition comprising one of the aforementioned adhesives and a suitable adhesive solvent system. After application of the adhesive composition onto ink layer 25, the volatile components of the composition evaporate, leaving only the non-volatile solid components thereof to form layer 27. An example of a polyester adhesive composition comprises 10.70%, by weight, ViTEL® 2300 polyester resin; 10.70%, by weight, ViTEL® 2700 polyester resin; 1.1%, by weight, BENZOFLEX S404 plasticizer; 1.1%, by weight, HULS 512 adhesion promoter; 19.20%, by weight, toluene; and 57.10%, by weight, methyl ethyl ketone.

Label 11 may be used in the conventional manner by contacting adhesive layer 27 to a desired article, such as a glass container, while applying sufficient heat to the bottom of carrier web 15 so as to cause transfer portion 21 to be released from support portion 13 and so as to cause adhesive layer 27 to become heat-activated for bonding to the desired article.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A method of labelling an article wherein the article is a silane-treated glass container, said method comprising the steps of:

(a) providing a heat-transfer label, said heat-transfer label comprising:

(i) a support portion, and (ii) a transfer portion over said support portion for transfer of the transfer portion from the support portion to the article upon application of heat to the support portion while the transfer portion is placed into contact with the article, said transfer portion comprising a protective lacquer layer, said protective lacquer layer comprising a polyester/vinyl lacquer, and an ink design layer over said protective lacquer layer, said ink design layer comprising one or more polyester inks printed in the form of line copy; and (b) transferring said transfer portion from said support portion to the article.

2. A method of labelling an article wherein the article is a refundable polyethylene terephthalate container, said method comprising the steps of:

(a) providing a heat-transfer label, said heat-transfer label comprising:

(i) a support portion, and (ii) a transfer portion over said support portion for transfer of the transfer portion from the support portion to the article upon application of heat to the support portion while the transfer portion is placed into contact with the article, said transfer portion comprising a protective lacquer layer, said protective lacquer layer comprising a polyester/vinyl with wax lacquer, said protective lacquer layer comprising about 24%, by weight, wax, and an ink design layer over said protective lacquer layer wherein said ink design layer includes two or more polyester inks printed in the form of a vignette; and (b) transferring said transfer portion from said support portion to the article.

3. A heat-transfer label comprising:

(a) a support portion; and (b) a transfer portion over said support portion for transfer of the transfer portion from the support portion to an article upon application of heat to the support portion while the transfer portion is placed into contact with the article, said transfer portion comprising:

(i) a protective lacquer layer, said protective lacquer layer comprising a polyester/vinyl with wax lacquer, said protective lacquer layer comprising about 24%, by weight, wax;

(ii) an ink design layer over said protective lacquer layer, said ink design layer comprising one or more polyester inks; and (iii) an adhesive layer over said ink layer.

4. The heat-transfer label as claimed in claim 3 wherein said ink design layer includes two or more polyester inks printed in the form of a vignette.

5. The heat-transfer label as claimed in claim 3 wherein said adhesive layer comprises one of a polyester adhesive, a polyester/vinyl adhesive and a polyester/vinyl with wax adhesive.

6. The heat-transfer label as claimed in claim 5 wherein said adhesive layer comprises a polyester adhesive.

7. The heat-transfer label as claimed in claim 3 wherein said support portion comprises a sheet of paper overcoated with a release layer of polyethylene.

8. The heat-transfer label as claimed in claim 3 further comprising a skim coat interposed between said support portion and said transfer portion.

9. A transfer portion of a heat-transfer label, said transfer portion comprising:

(a) a protective lacquer layer, said protective lacquer layer comprising a polyester/vinyl with wax lacquer, said protective lacquer layer comprising about 24%, by weight, wax; and (b) an ink design layer over said protective lacquer layer, said ink design layer comprising one or more polyester inks.

10. The transfer portion as claimed in claim 9 wherein said ink design layer includes two or more polyester inks printed in the form of a vignette.

11. The transfer portion as claimed in claim 9 further comprising an adhesive layer, said adhesive layer being positioned over said ink design layer.

12. The transfer portion as claimed in claim 11 wherein said adhesive layer comprises one of a polyester adhesive, a polyester/vinyl adhesive and a polyester/vinyl with wax adhesive.

13. The transfer portion as claimed in claim 12 wherein said adhesive layer comprises a polyester adhesive.

* * * * *